United States Patent [19]
Dan et al.

[11] Patent Number: 5,490,248
[45] Date of Patent: Feb. 6, 1996

[54] DISK ARRAY SYSTEM HAVING SPECIAL PARITY GROUPS FOR DATA BLOCKS WITH HIGH UPDATE ACTIVITY

[75] Inventors: Asit Dan, West Harrison; Kun-lung Wu, Yorktown Heights; Philip S. Yu, Chappaqua, all of N.Y.

[73] Assignee: International Business Machines Corporation, Armonk, N.Y.

[21] Appl. No.: 364,052

[22] Filed: Dec. 27, 1994

Related U.S. Application Data

[63] Continuation of Ser. No. 17,920, Feb. 16, 1993, abandoned.

[51] Int. Cl.$^6$ .................................................. G06F 11/00
[52] U.S. Cl. ..................................................... 395/182.04
[58] Field of Search ........................... 395/575, 425; 371/10.1, 11.1

[56] References Cited

U.S. PATENT DOCUMENTS

| | | | |
|---|---|---|---|
| 4,638,425 | 1/1987 | Hartung | 364/200 |
| 4,912,712 | 3/1990 | Yamada | 371/57.2 |
| 4,967,414 | 10/1990 | Lusch et al. | 371/51.1 |
| 5,155,835 | 10/1992 | Belsan | 395/425 |
| 5,263,145 | 11/1993 | Brady et al. | 395/425 |

FOREIGN PATENT DOCUMENTS

| | | |
|---|---|---|
| 0497067 | 8/1992 | European Pat. Off. . |
| 1314140 | 4/1973 | United Kingdom . |
| WO9209035 | 5/1992 | WIPO . |

OTHER PUBLICATIONS

Menon et al "Methods for Improved Update Performance of Disk Arrays" Proc. of the 25th Hawaii Int. Conf. on System Sciences Jan. 1992 pp. 74–83.

Mourad et al "Database Recovery Using Redundant Disk Arrays" 8th Int. Conf. on Data Eng. pp. 176–183 Feb. 1992.

*Primary Examiner*—Robert W. Beausoliel, Jr.
*Assistant Examiner*—Joseph E. Palys
*Attorney, Agent, or Firm*—Ronald L. Drumheller

[57] ABSTRACT

In a digital storage disk array system in which parity blocks are created and stored in order to be able to recover lost data blocks in the event of failure of a disk, high-activity parity groups are created for data blocks having high write activity and low-activity parity groups are created for data blocks not having high write activity. High-activity parity blocks formed from the high-activity data blocks are then stored in a buffer memory of a controller rather than on the disks in order to reduce the number of disk accesses during updating.

12 Claims, 5 Drawing Sheets

DISK ARRAY SYSTEM HAVING SPECIAL PARITY GROUPS FOR DATA BLOCKS WITH HIGH UPDATE ACTIVITY

This is a continuation of application Ser. No. 08/017,920, filed Feb. 16, 1993, now abandoned.

DESCRIPTION

1. Field of the Invention

This invention relates generally to permanent storage systems for digital information, especially those of the disk type, and more particularly to disk array systems which create and store parity blocks in order to be able to recover from a disk failure.

2. Background of the Invention

A Redundant Array of Inexpensive Disks (RAID) has been proposed as a means for providing large storage of digital information with high throughput and at a low cost. The idea with RAID is to use less expensive disks, which individually might have a higher chance of failure, but then to add enough redundancy by creating and storing parity blocks to be able to recover from a disk failure. At least one disk failure is typically tolerated and some schemes have been proposed which allow recovery when more than one disk fails simultaneously. FIG. 1 shows a disk array subsystem architecture on which a RAID organization can be implemented. A disk controller 30 having a cache 31 manages an array of inexpensive disks 40–43. In a RAID organization with a total of N+1 disks, one parity block is created for each N data blocks, and each of these N+1 blocks is stored on a different disk. A parity block is computed from N data blocks by computing a bitwise "Exclusive Or" of the N data blocks. The parity block along with the N data blocks from which that parity block was computed are called a parity group. Any block in a parity group can be computed from the other blocks of that parity group.

In "A Case for Redundant Arrays of Inexpensive Disks (RAID)," *Proc. of ACM SIGMOD International Conference on Management of Data*, pp. 109–116, 1988, D. A. Patterson, G. Gibson and R. H. Katz describe five types of disk arrays called RAID level 1 through 5. Of particular interest are disk arrays with an organization of RAID level 5, because the parity blocks in this RAID type are distributed evenly across all disks and therefore cause no bottleneck problems. FIG. 2 shows a data mapping for a RAID level 5 system, where Di represents data block i and Pi represents parity block i. In FIG. 2, P0 contains the parity or XOR ($\oplus$) of data blocks D0, D1, D2 and D3; parity blocks P0, P1, P2, P3 and P4 are stored on different disks.

In a RAID environment, unfortunately a disk write operation is far more expensive than on a traditional disk system because it consists of four disk access operations as compared with two disk access operations on a traditional disk system. Whenever the disk controller in a RAID organization receives a request to write a data block, it must not only update (i.e., read and write) the data block itself, but also must update (i.e., read and write) the corresponding parity block to maintain consistency. For instance, if data block D1 in FIG. 2 is to be written, the new value of P0 is calculated as:

new $P0$=old $D1 \oplus$ new $D1 \oplus$ old $P0$.

Therefore, the following four disk access operations are required: (1) read the old data block D1; (2) read the old parity block P0; (3) write the new data block D1; and (4) write the new parity block P0. The reads must be completed before the writes can be started.

In "Performance of Disk Arrays in Transaction Processing Environments," *Proc. of International Conference on Distributed Computing Systems*, pp. 302–309, 1992, J. Menon and D. Mattson teach that caching or buffering storage blocks at the control unit can improve the performance of a RAID disk array subsystem. However, while buffering dirty blocks at the control unit can reduce the number of disk writes of both data and parity blocks, upon a control unit failure, updated data blocks whose disk-write operations got deferred will be lost. If the corresponding parity blocks are also buffered (which will be the case generally because the corresponding parity blocks were updated at the same time), there will be no up-to-date parity block available on disk for recovery of the lost data blocks. In addition, since controller buffer space is necessarily limited, only a limited number of blocks can be buffered at any one time. If the block update pattern is skewed across many parity blocks (which is usually the case), the buffer will need to be large to avoid thrashing.

SUMMARY OF THE INVENTION

It is an object of this invention to allow a disk array system of the RAID type to update data blocks with less write activity to the disks.

It is also an object to reduce write activity to the disks when blocks are updated without realizing the disk system unrecoverable when the disk controller fails.

A further object is to achieve such reduction in write activity to the disks while minimizing buffer requirements for the disk controller.

These and further objects and features have been accomplished in accordance with this invention by creating special high-activity parity groups entirely from data blocks with high write activities and storing the high-activity parity blocks for these special high-activity parity groups in a buffer memory in the controller unit of the disk array system. In addition to these high-activity special parity groups, low-activity parity groups are also formed consisting of data blocks with low write activities. The low-activity parity blocks for these low-activity parity groups are stored on the disks.

A data block is either part of a high-activity parity group or a low-activity parity group, but not both. All of the data blocks are stored on the disks. There is no apparent advantage in storing any low-activity data blocks in the controller and the high-activity data block, s (i.e., the data blocks in the high-activity parity groups) must be stored on the disks in order to be able to recover the high-activity parity blocks in the event the controller unit for the disks fails.

Because most of the write activity to data blocks will occur to the high-activity data blocks, most of the access operations to parity blocks will occur to the high-activity parity blocks stored in the controller. Because these high-activity parity blocks are only stored in the controller unit, there is a significant reduction in write activity to blocks stored on the disks.

Preferably a data block is dynamically assigned to either a high-activity parity group or to a low-activity parity group, but not to both simultaneously. This is preferably accomplished by defining default parity groups for all of the data blocks; then removing a data block with high write activity from its default parity group; and adding this removed high-activity data block to a high-activity parity group.

When a data block in a high-activity parity group later experiences low write activity, it is removed from its high-activity parity group and returned to its default parity group. Whenever a data block is moved from one parity group to another one, the parity blocks for both of these groups are recomputed and updated. Since the default parity groups have had their high-activity data blocks removed, what is left in reality are parity groups of data blocks having only low write activity, so these default parity groups with their high-activity data blocks removed become the low-activity parity groups of this invention and are referred to herein as such.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
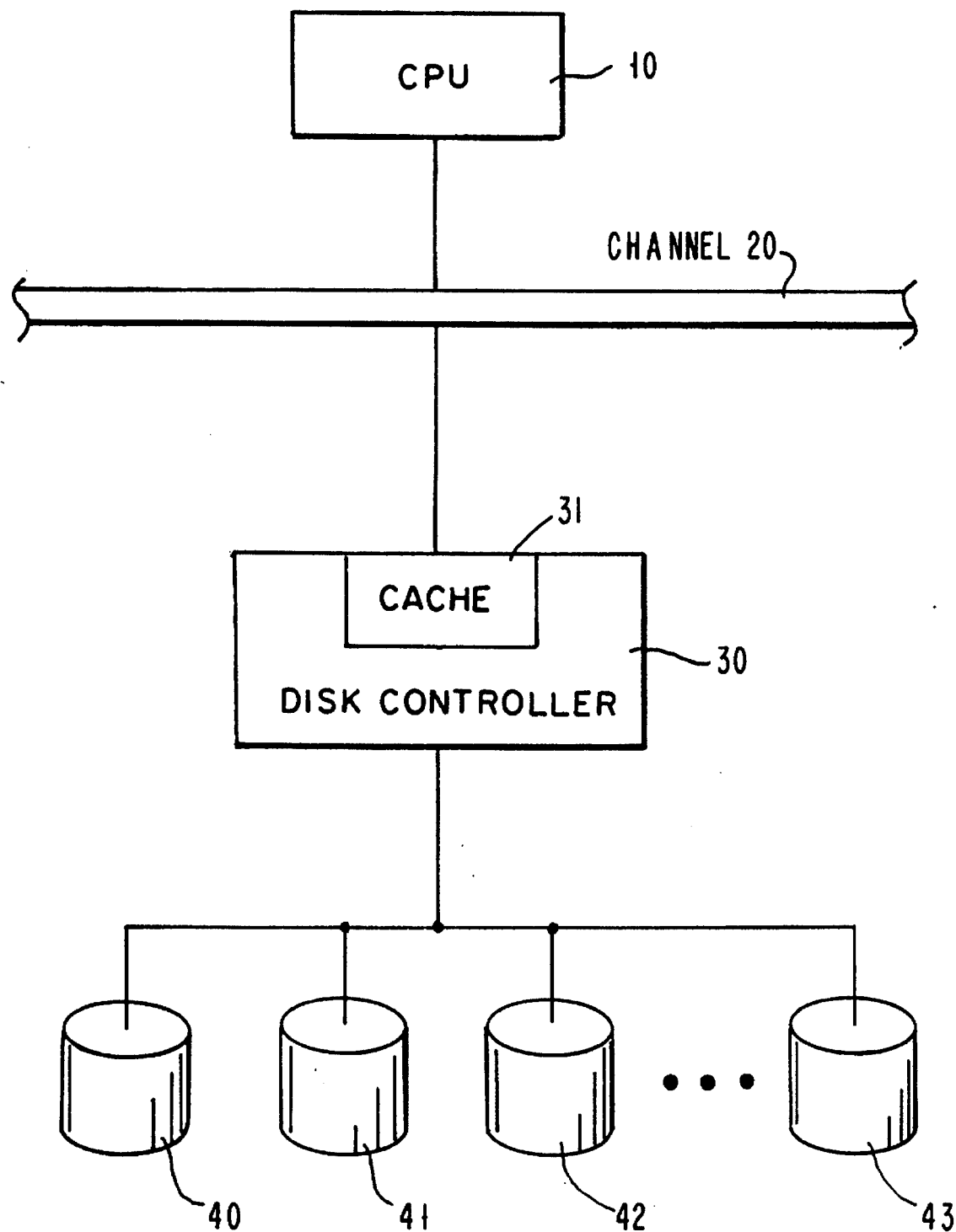
FIG. 1 is a high level block diagram illustrating the architecture of a disk array subsystem in which the present invention can be implemented.
Figure 2:
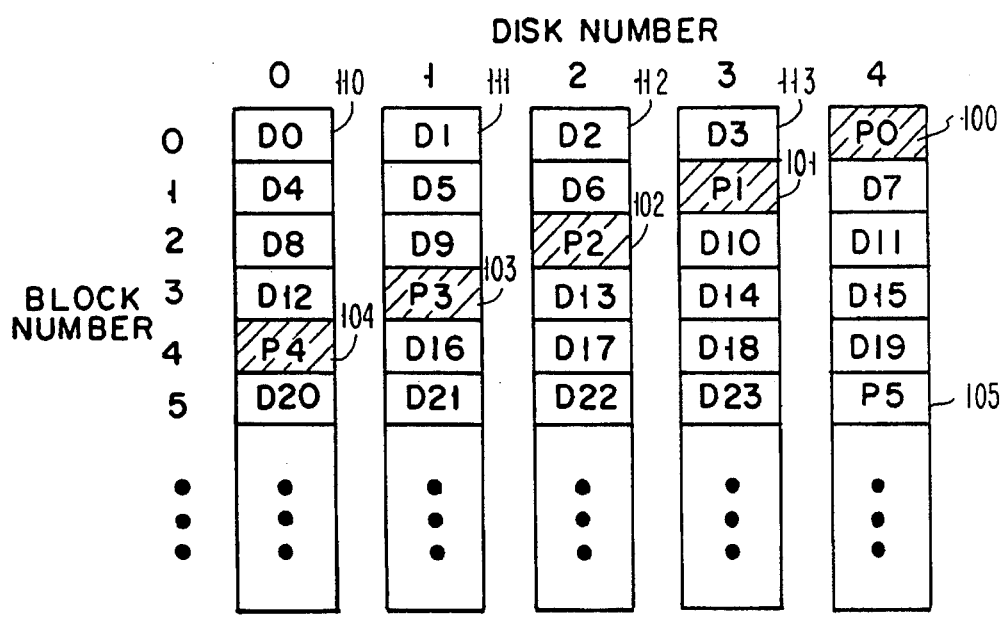
FIG. 2 is a conventional RAID level 5 data mapping showing the placement of data and parity blocks.

The present invention may be practiced on the disk array subsystem shown in FIG. 1, which consists of a disk controller 30 having a cache memory 31 and an array of disks 40, 41, 42, and 43. The cache memory 31 in the disk controller 30 is used in this invention to buffer the parity blocks of high-activity parity groups formed in accordance with this invention. The data mapping in the disk array 40–43 of the detailed embodiment to be described is a RAID level 5 mapping. FIG. 2 shows a conventional RAID level 5 data mapping, in which parity blocks are labelled 100, 101, 102, 103, 104 and 105. Parity block P0 labelled 100 is the XOR of data blocks D0 labelled 110, D1 labelled 111, D2 labelled 112, and D3 labelled 113.

Before an embodiment of this invention is described in more detail, however, the general advantage or buffering parity blocks in the control unit cache will be described first. For each data block update request to the disk controller 30, if the corresponding parity block is already in the control unit cache 31, only two physical disk access operations are required for the update, i.e., to read the old data and to write the new data. A disk read and write operation on a parity block will be avoided. Instead, the old value of the data block is bitwise XORed with both its new value and the value of the old parity block, which is in-cache, to create a new in-cache parity block.

In a RAID level 5 system with a total of N+1 disks, each parity group includes N data blocks and a parity block. The traditional approach is to divide adjacent data blocks into parity groups, such as that shown in FIG. 2. In FIG. 2, for example, data blocks D0, D1, D2 and D3 and parity block P0 form a parity group. This approach certainly has the appeal of making the parity group mapping straightforward. However, if data blocks with high and low update frequencies are mixed into the same parity group, parity block buffering will be less efficient. This invention addresses this problem by dividing the data blocks into two kinds of data blocks (i.e., high-activity data blocks and low-activity data blocks), forming high-activity parity groups from the high-activity data blocks and low-activity parity groups from the low-activity data blocks; and handling the parity blocks for each of these two kinds of parity groups differently (i.e. storing only the high-activity parity blocks in the controller cache).

In accordance with a preferred embodiment, each data block has a default parity group assignment based on its address as in the traditional approach. One possible default assignment is shown in FIG. 2, in which data blocks iN+k, for k=0, ..., N−1 are assigned to parity group i. In addition to the default parity groups, H special parity groups are also formed for the frequently updated blocks. The number of these special parity groups will be relatively small and can be managed by a table-lookup as will be explained in more detail below. The special parity groups are referred to herein as the high-activity parity groups, and they may be formed dynamically or re-adjusted periodically. The parity group formation is like a matrix organization where each block besides its default parity group can be assigned to a high-activity parity group if it has high update activity. However, at any particular instant, only one of the two parity group assignments can be active for any data block. When a data block is assigned to a high-activity parity group, the active link to its default parity group is deactivated. Also when a data block is dropped out from a high-activity parity group due to changing workload activities, it returns to active status in its default parity group.

Figure 3:
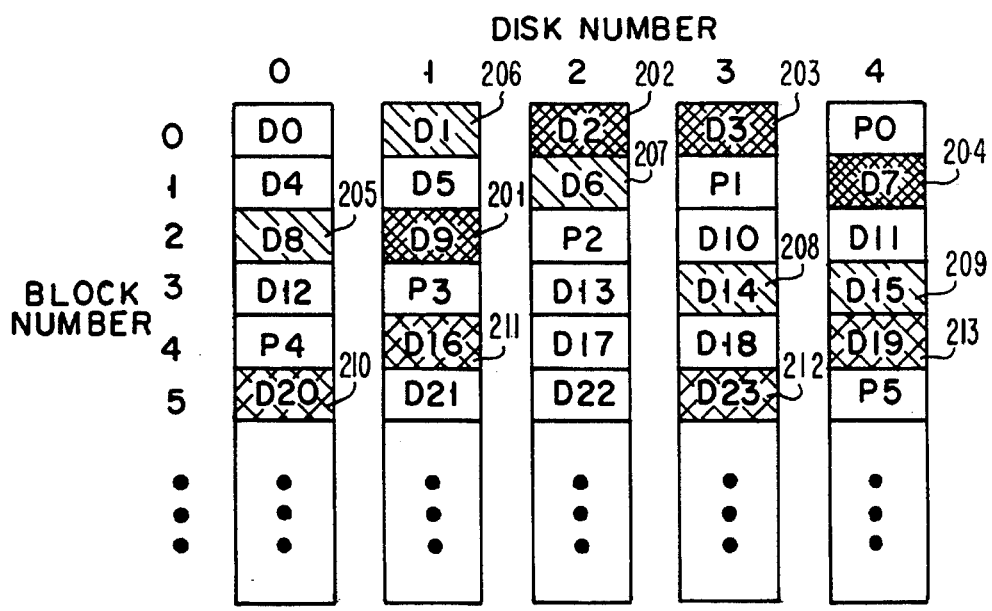
FIG. 3 is an example of data mapping for low-activity and high-activity parity groups in accordance with this invention.

FIG. 3 shows an example of parity group mapping in accordance with this invention. Data blocks D1, D2, D3, D6, D7, D8, D9, D14, D15, D16, D19, D20 and D23 represent data blocks with high update activity. Among them, data blocks D2, D3, D7 and D9 labelled 202, 203, 204 and 201, respectively, are mapped to high-activity group 0. Similarly, data blocks D1, D6, D8, D14 and D15 labelled 206, 207, 205, 208 and 209 are mapped to high-activity parity group 1. As a consequence of creating high-activity parity groups, what is left active in the default parity groups changes accordingly. For example, in FIG. 3, low-activity parity group 0 (i.e., what is now left active in default parity group 0) contains only data block D0; low-activity parity group 1 (i.e., what is now left active in default parity group 1) contains data blocks D4 and D5; and low-activity parity group 2 (i.e., what is now left active in default parity group 2) contains data blocks D10 and D11. High-activity parity groups 3, 4, ... are not shown in FIG. 3.

Note that a high-activity parity group need not contain the same number of data blocks as in the original default parity group. It can contain up to N+1 data blocks with at most one high-activity data block from each disk if the frequently updated data blocks are also the frequently read blocks, a smaller group size for the high-activity parity groups can provide better performance during recovery time. With a smaller group size, a fewer number of blocks needs to be read to recover a block on a lost disk.

A description will now be provided: on how to form and maintain the special high-activity parity blocks to reduce the number of disk writes; on how to identify data blocks that are highly updated; and on how to bring a data block into and out of a high-activity parity group.

The identification and maintenance of the high-activity parity groups can be done either statically or dynamically. In the former case the frequently updated data blocks are identified off-line and their assigned parity groups are stored in a table. Upon an update to a data block during on-line operation, if the data block is found in the stored table then its assigned high-activity parity block is updated in the buffer memory. Otherwise, its default parity block is updated on disk.

Figure 4:
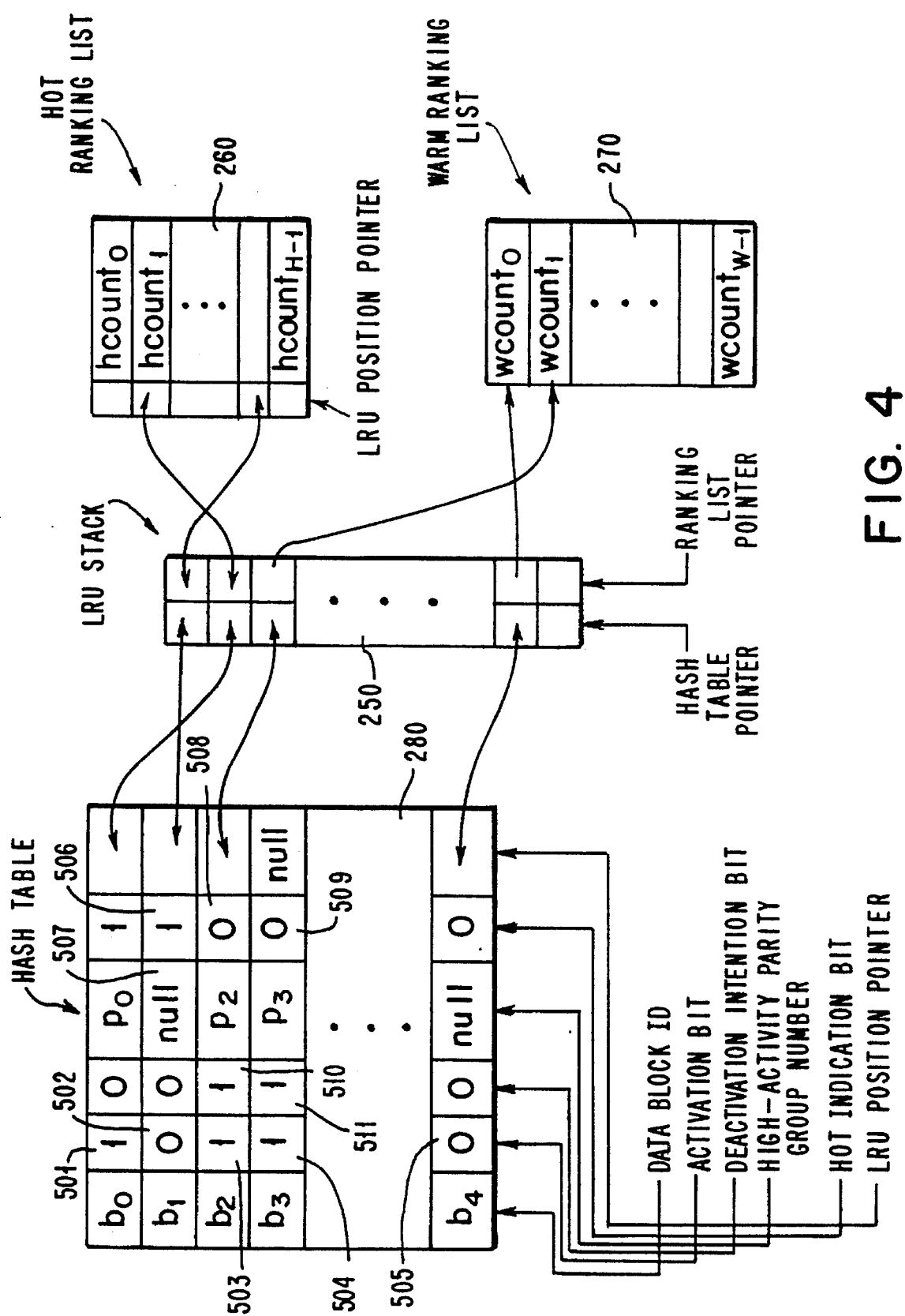
FIG. 4 is a example of data structures for maintaining high-activity data blocks for each disk.

FIG. 4 shows the data structures required for an on-line approach to identifying and maintaining the high-activity parity groups. For each disk, an LRU stack 250 is used to keep track of the H+W most recently updated data blocks. Note that the size of the LRU stack (H+W) is larger than the number of high-activity parity blocks H that are kept in the buffer memory. Besides the H high-activity data blocks, considered to be hot in FIG. 4, the remaining W entries of the LRU stack also keep track of the data blocks that are warmest and have the potential of becoming hot in the future. For each carry in the LRU stack an associated update count is also maintained. The count is set to 1 the first time the block is brought from outside the LRU stack. As long as the address is retained in the LRU stack, for each subsequent update to that block its count is incremented. Two separate ordered lists called a Hot ranking list 260 and a Warm ranking list 270 are maintained. Within each list the entries arc ordered by their associated update count, i.e., $hcount_i \geq hcount_j$ iff $i<j$, and $wcount_i \geq wcount_j$ iff $i<j$. Once an entry is considered hot, it remains hot until its address is replaced from the LRU stack (implying the block has not been updated for a long time) or another hotter entry in the warm ranking list replaces it from the bottom of the hot ranking list. Note that if all the entries are equally hot then data blocks will frequently join and leave the high-activity parity groups, incurring a lot of overhead associated with joining and dropping off from the special parity group. Therefore, the top entry of the warm list does not replace the bottom entry of the hot list until $wcount_0$ exceeds $hcount_{H-1}$ by a pre-specified threshold, $\delta$.

A hash table 280 is used to keep the various information associated with each data block that is required either for the identification of hot data blocks or for the maintenance of special parity groups. The field called activation bit in the hash table in FIG. 4 is set to 1 (0 otherwise) for any entry if the associated data block currently belongs to a high-activity parity group, and the group number is stored in the field called high-activity parity group number. In FIG. 4, data blocks $b_0$, $b_2$ and $b_3$ are members of high-activity parity groups $p_0$, $p_2$ and $p_3$, respectively. Hence, their corresponding activation bits 501, 503 and 504 respectively are set to 1. Activation bits 502 and 505 are set to zero since data blocks $b_1$ and $b_4$ are not members of any high-activity parity group. The field called hot indication bit is set to 1 if the data block is currently considered hot by the identification process; otherwise it is set to zero. Note that when a data block is identified as hot, it need not be included immediately into a high-activity parity group. The inclusion process can be done on the next update to the block or by a background process. Data block $b_1$ in FIG. 4 is hot but it has not yet been included into a high-activity parity group. Thus, its corresponding high-activity parity group number 507 is null and its hot indication bit 506 is 1.

On the other hand, if a data block is not currently considered hot but it has been a member of a high-activity parity group, then the field called deactivation intention bit for that entry ill the hash table in FIG. 4 is set to 1. As in the case of including a hot data block into a high-activity parity group, a background process can remove a data block that is not anymore considered as hot from its associated high-activity group. The hot indication bits 508 and 509 for data blocks $b_2$ and $b_3$ are zero while the corresponding activation bits are 1, indicating that they are not considered hot anymore by the identification process but they still belong to a high-activity group. Therefore, their deactivation intention bits 510 and 511 are set to 1. Note that when a block is pushed out of the LRU stack but its associated activation bit is 1, as shown for block $b_3$, its hash table entry cannot be deleted until the block is removed from the high-activity parity group.

Figure 5:
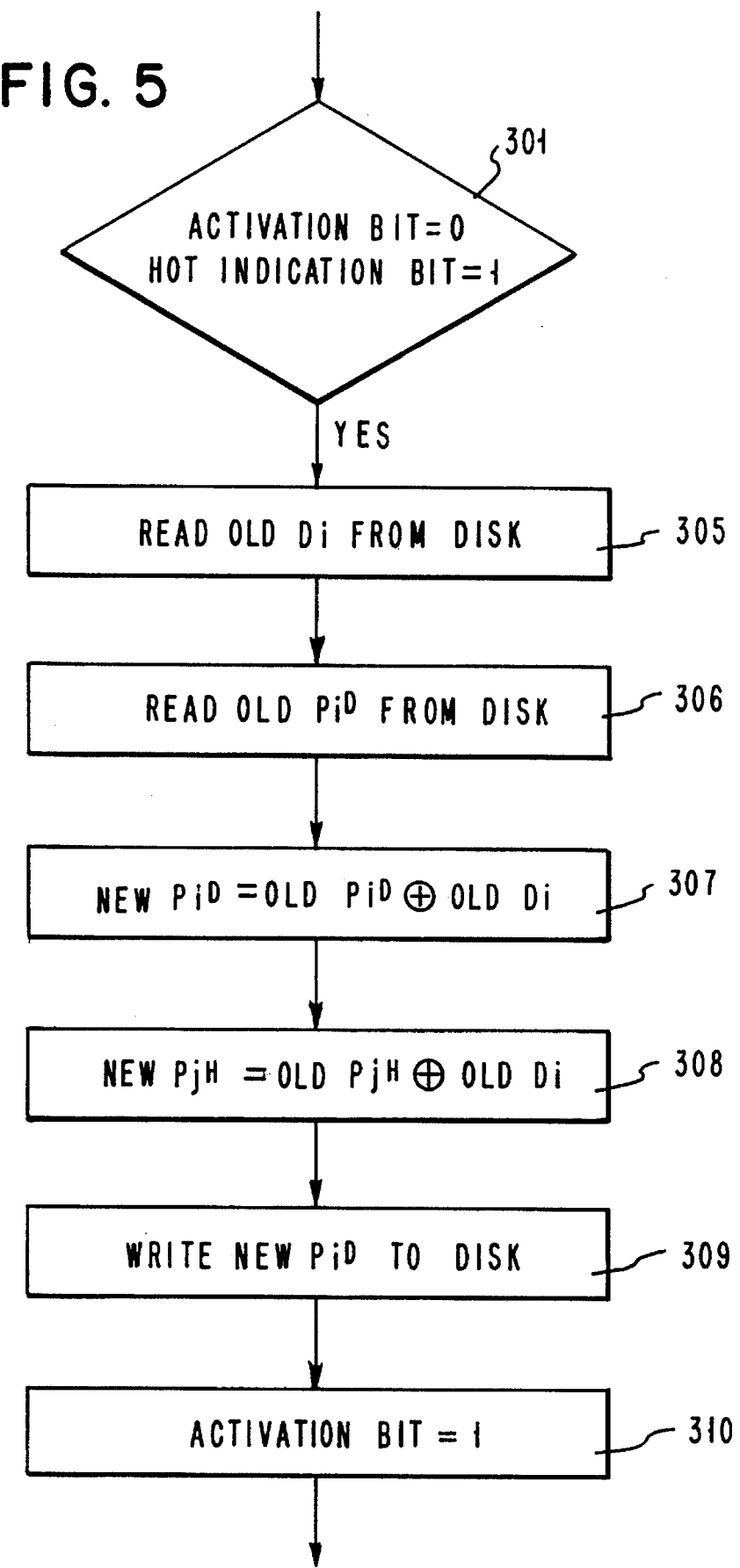
FIG. 5 is a high level flow diagram of a procedure for adding a high-activity data block to a high-activity parity group.

The process by which a data block Di becomes included into a high-activity parity group j is best described by the high-level flow diagram shown in FIG. 5. Assume that the corresponding low-activity parity block for Di is $Pi^D$, and the corresponding high-activity parity block for Di is $Pj^H$. The inclusion process is done by a background process when the activation bit is 0 and the hot indication bit is 1. The old Di is first read from disk as shown in block 305, and the old low-activity parity block $Pi^D$ which covers Di is also read from disk as shown in block 306. To remove Di from the low-activity parity group, the old $Pi^D$ is bitwise XORed with the old Di to generate a new $Pi^D$ as shown in block 307, and then the new $Pi^D$ is written back to disk as shown in block 309. To include Di into the high-activity group, the old Di is simply bitwise XORed with the old $Pj^H$ to generate the new $Pj^H$ as shown in block 308. The activation bit is then set to 1 as shown in block 310.

Note that for all subsequent updates to a data block after it is included into a high-activity parity group, the old Di is first read from disk and is bitwise XORed with both the old $Pj^H$ (which is in-cache) and the new Di to produce the new $Pj^H$ in cache. Then the new Di is written onto disk. There are no disk access operations for the parity block as long as Di remains in the high-activity group.

Figure 6:
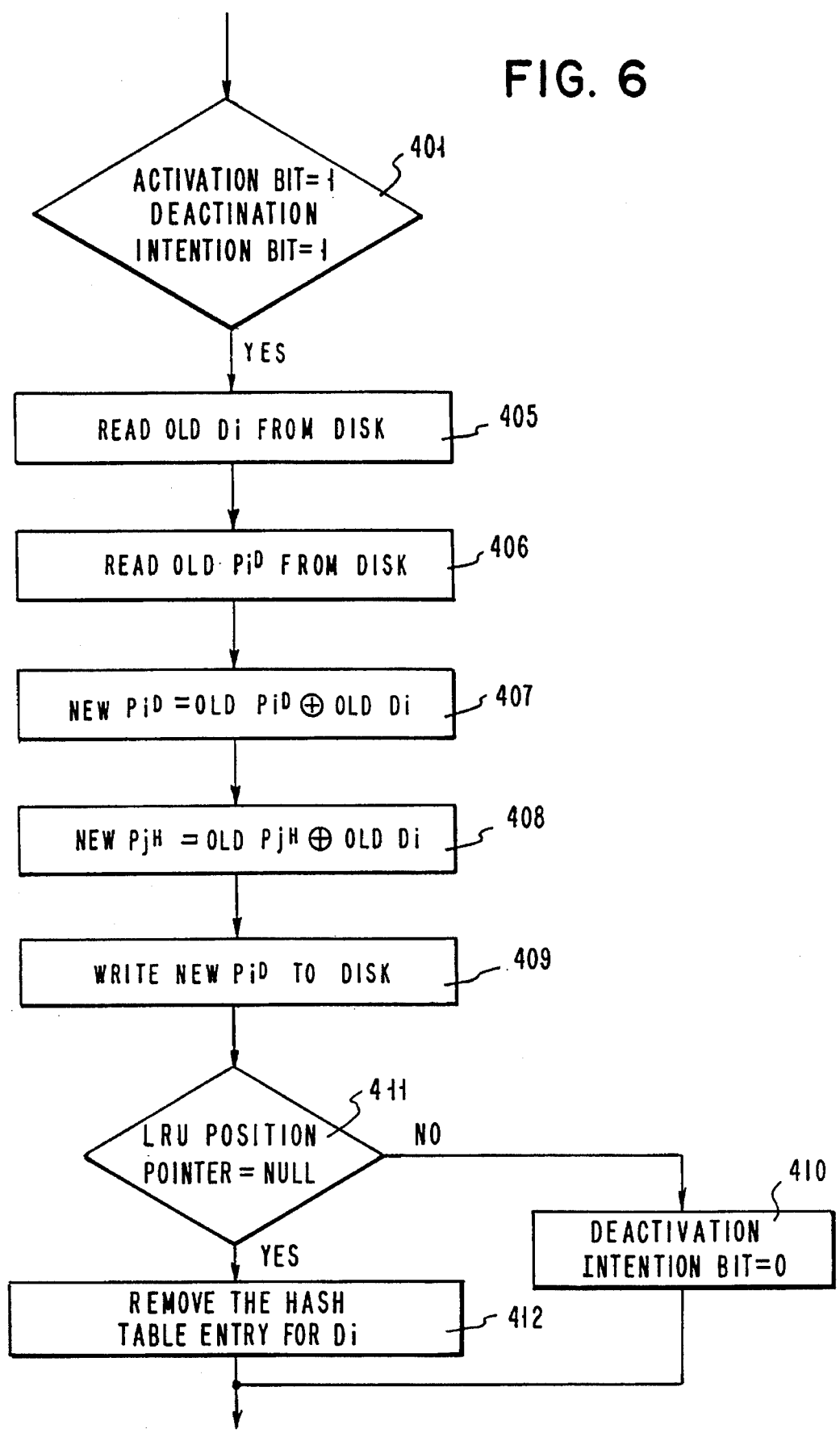
FIG. 6 is a high level flow diagram of a procedure for removing a data block from a high-activity parity group.

The removal of a data block from a high-activity parity group is also done by a background process when both the activation bit and deactivation intention bit are 1. FIG. 6 is a high-level flow diagram illustrating the procedure for removing a data block from a high-activity group. The old value of the data block is first read from the disk as shown in block 405. The old Di is then bitwise XORed with the old parity block $Pj^H$ of the high-activity parity group to take it out of the high-activity parity group. After removing the data block from the high-activity group, the old corresponding low-activity parity block $Pi^D$ is read from disk as shown in block 406 and is bitwise XORed with the old Di to produce the new low-activity parity block as shown in block 407. The data block is then put back to the corresponding low-activity group by writing the new low-activity parity block back to disk as shown in block 409. The hash table entry for that block can then be deleted if it is not in the LRU stack anymore. Otherwise, the deactivation intention bit is set to 0.

Note that when an update to a data block is needed and that data block is to be, but has not yet been, included in or removed from a high-activity parity group, the background process can be given a higher priority than the update process to complete the inclusion or removal process before the update process can proceed. Also, for recovery purposes, no more than one data block from the same disk can be mapped to one high-activity parity group; otherwise, the data cannot be recovered from a failure in that disk. Therefore, a data block may need to be removed first before another data block on the same disk can be included into a high-activity group.

Finally, some comments on recovery are provided. If a disk in the disk array fails, the recovery scenario is the same as that of a standard RAID disk array. The missing block in each parity group having a block on the failed disk is derived from the other blocks of its parity group on other disks. If the control unit fails, the high-activity parity blocks along with the hash tables maintaining the mappings of high-activity parity groups in the control unit cache may be lost. Since all of the data blocks are still available on disks, however, the high-activity parity blocks can be re-derived if the mappings stored in the hash tables can be recovered. If the hash tables cannot be recovered, a re-computation of all default parity blocks on the entire disk array is required. This is done using a base assumption that there are no special high-activity parity groups at all. Then the system can resume its operation. The assumption of no high-activity parity groups is made because once the mappings of high-activity parity groups are lost, the mappings of low-activity parity groups are lost as well. So it is assumed that there are no high-activity parity groups and the full default assignment groups are assumed to be the low-activity parity groups, which requires recomputation of all of the low-activity parity groups. Once operation is resumed, high-activity data blocks can be identified and removed from the default groups once again as described above.

To avoid a recomputation of all of the default parity groups upon failure of the controller, it is possible to make sure that the hash tables are not lost even if it is not practical to assure against loss of the high-activity parity blocks. One possible approach is to store the hash tables in nonvolatile memory. Without nonvolatile memory, another approach is to periodically checkpoint the hash tables to a stable storage and make the inclusion and removal of a data block into and out of a high-activity parity group an atomic action by using, for example, the write-ahead logging approach commonly used in most database systems. Upon a control unit failure, the mappings of a hash table can be recovered by first retrieving the most recent checkpoint of the hash table and then applying the logs to it. Once the hash table mappings are recovered, the high-activity data blocks on disk can be identified and the high-activity parity blocks can be computed from them.

While the invention has been particularly shown and description with reference to preferred embodiments thereof, it will be understood by those skilled in the art that various changes in form and details may be made therein without departing from the spirit and scope of the invention.

We claim:

1. An improved digital information storage disk array system of the type wherein data blocks are stored on a plurality of disks by a disk controller and parity blocks are derived from said data blocks and stored for use in recovering lost data blocks in the event of a disk failure, said improvement comprising:

means for dividing said data blocks into a group of high update activity data blocks and a group of low update activity data blocks based upon anticipated write activity to each of said data blocks:

means for defining high update activity parity groups for said high update activity data blocks and for defining low update activity parity groups for said low update activity data blocks;

a high update activity parity block being derived for each said high update activity parity group from said high update activity data blocks in said each high update activity parity group;

a low update activity parity block being derived for each said low update activity parity group from said low update activity data blocks in said each low update activity parity group; and means for storing said high update activity parity blocks in said disk controller and for storing said low update activity parity blocks on said disks, whereby updates to said high update activity parity blocks can be made by said disk controller without accessing said disks, thereby reducing disk access activity.

2. An improved digital information storage disk array system as defined in claim 1 wherein said storage disk array system is a RAID system.

3. An improved digital information storage disk array system as defined in claim 1 wherein said low update activity data blocks and said low update activity parity block of any said low update activity parity group are each stored on separate ones of said disks.

4. An improved digital information storage disk array system as defined in claim 3 wherein said low update activity parity blocks are distributed among said disks for storage.

5. An improved digital information storage disk array system as defined in claim 1 wherein said activity high update activity data blocks of any said high update activity parity group are each stored on separate ones of said disks.

6. An improved digital information storage disk array system as defined in claim 1 wherein said means for dividing comprises means for determining an updating rate for each of said data blocks.

7. An improved digital information storage disk array system as defined in claim wherein said means for defining comprises means for provisionally assigning each of said data blocks to one of a plurality of individual default parity groups.

8. An improved digital information storage disk array system as defined in claim 7 wherein said means for defining low update activity parity groups comprises means for removing high update activity data blocks from said default parity groups.

9. An improved digital information storage disk array system as defined in claim 8 wherein said means for defining high update activity parity groups comprises means for adding each one of said removed high update activity data blocks to one of a plurality of high update activity parity groups.

10. An improved digital information storage disk array system as defined in claim 9 wherein said means for dividing further comprises means for removing high update activity data blocks which no longer have a high rate of update activity from said high update activity parity groups and returning each of said removed high update activity data blocks to its provisionally assigned default parity group.

11. An improved controller for reducing write activity to disk for a digital information storage disk array, said array being of the type wherein at least a portion of each disk in said array is partitioned into equally sized storage blocks and parity groups of said storage blocks are defined and maintained by said controller, each said parity group comprising a storage block from each one of a multiplicity of said disks, said storage blocks in each said parity group comprising a plurality of data blocks and a single parity block, said parity block in any one of said parity groups storing information derived from said data blocks in said any one parity group and being usable to recover data blocks of said any one parity group in the event of disk failures, said improvement comprising:

means for identifying a subset of all of said data blocks, said data blocks in said subset being anticipated to have a higher likelihood of being modified than said data blocks not in said subset;

means liar defining special parity groups for said subset or data blocks, each one of said special parity groups comprising:

a plurality of data blocks from said subset, each said data block in said one special parity group being stored on a separate one of said disks; and a special parity block derived from said data blocks in said one special parity group;

means for removing any said data blocks which are part of any said special parity group from any said parity group which is not one of said special parity groups and for updating any said parity block of any said parity group from which one of said data blocks has been removed; and means for storing said special parity blocks in said controller rather than on said disks, whereby updates to said special parity blocks can be made by said controller without writing to said disks, thereby reducing write activity to said disks.

12. An improved method for storing digital information on a disk array of the type wherein data blocks are stored on a plurality of disks by a controller and parity blocks are derived from said data blocks and stored for use in recovering lost data blocks in the event of a disk failure, said improved method comprising the steps of:

dividing said data blocks into a group of high update activity data blocks and a group of low update activity data blocks based upon anticipated write activity to each of said data blocks;

defining high update activity parity groups for said high update activity data blocks;

defining low update activity parity groups for said low update activity data blocks;

deriving a high update activity parity block for each said high update activity parity group from said high update activity data blocks in said each high update activity parity group;

deriving a low update activity parity block for each said low update activity parity group from said low update activity data blocks in said each low update activity parity group;

storing said high update activity parity blocks in said controller; and storing said low update activity parity blocks on said disks, whereby updates to said high update activity parity blocks can be made by said controller without accessing said disks, thereby reducing disk access activity.

* * * * *